US008370506B2

(12) United States Patent
Maes

(10) Patent No.: US 8,370,506 B2
(45) Date of Patent: *Feb. 5, 2013

(54) SESSION INITIATION PROTOCOL-BASED INTERNET PROTOCOL TELEVISION

(75) Inventor: Stéphane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,413

(22) Filed: Mar. 9, 2012

(65) Prior Publication Data

US 2012/0173745 A1    Jul. 5, 2012

Related U.S. Application Data

(63) Continuation of application No. 11/943,101, filed on Nov. 20, 2007, now Pat. No. 8,161,171.

(51) Int. Cl.
*G06F 15/16* (2006.01)
(52) U.S. Cl. ......... 709/228; 709/219; 709/220; 709/227
(58) Field of Classification Search .................. 709/228, 709/219, 220, 227
See application file for complete search history.

(56) References Cited

U.S. PATENT DOCUMENTS

| 5,414,812 | A | 5/1995 | Filip et al. |
| 5,613,060 | A | 3/1997 | Britton et al. |
| 5,699,513 | A | 12/1997 | Feigen et al. |
| 5,786,770 | A | 7/1998 | Thompson |
| 5,850,517 | A | 12/1998 | Verkler et al. |
| 5,867,665 | A | 2/1999 | Butman et al. |
| 5,946,634 | A | 8/1999 | Korpela |
| 6,115,690 | A | 9/2000 | Wong |
| 6,119,104 | A | 9/2000 | Brumbelow |
| 6,128,645 | A | 10/2000 | Butman et al. |
| 6,157,941 | A | 12/2000 | Verkler et al. |
| 6,163,800 | A | 12/2000 | Ejiri |
| 6,192,414 | B1 | 2/2001 | Horn |
| 6,230,271 | B1 | 5/2001 | Wadlow et al. |
| 6,272,556 | B1 | 8/2001 | Gish |

(Continued)

FOREIGN PATENT DOCUMENTS

EP   2 034 748 A1   3/2009
WO   2007134468 A1   11/2007

OTHER PUBLICATIONS

U.S. Appl. No. 11/939,705, filed Nov. 14, 2007, Advisory Action mailed Jun. 1, 2012, 9 pages.

(Continued)

*Primary Examiner* — Yves Dalencourt
(74) *Attorney, Agent, or Firm* — Kilpatrick Townsend & Stockton LLP

(57) ABSTRACT

Video on demand (VoD) and other video streaming and delivery mechanisms are provided using a messaging protocol (e.g., a session initiation protocol (SIP))-based approach that builds upon existing service delivery platforms. In one example, SIP functionality is extended to provide the ability to control and alter a delivery mode of a content stream, such as to change a playback mode or quality of service, by providing such requests as part of the instruction or payload of existing SIP messages, or by providing new SIP messages. Using SIP allows for third party control, such as by IPTV applications, which is not provided by current Real Time Streaming Protocol (RTSP)-based systems. SIP also can establish a peer-to-peer connection between a client and a SIP-enabled content server to allow the client to directly control the media stream. As an advantage over RTSP, SIP provides for bi-directional messaging between SIP endpoints.

17 Claims, 9 Drawing Sheets

U.S. PATENT DOCUMENTS

| | | |
|---|---|---|
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,089,317 B2 | 8/2006 | Jeyaraman et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 * | 8/2010 | Ellis .............................. 725/93 |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 8,023,971 B2 | 9/2011 | Egli |
| 8,032,920 B2 | 10/2011 | Maes |
| 8,068,860 B1 | 11/2011 | Midkiff |
| 8,073,810 B2 | 12/2011 | Maes |
| 8,090,848 B2 | 1/2012 | Maes |
| 8,161,171 B2 * | 4/2012 | Maes ........................... 709/228 |
| 8,214,503 B2 | 7/2012 | Maes |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |

| | | |
|---|---|---|
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0118662 A1 | 5/2007 | Vishwanathan et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0080479 A1 | 4/2008 | Maes |
| 2008/0109853 A1* | 5/2008 | Einarsson et al. ............ 725/62 |
| 2008/0126541 A1 | 5/2008 | Rosenberg et al. |
| 2008/0127232 A1 | 5/2008 | Langen et al. |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0185772 A1 | 7/2010 | Wang et al. |
| 2010/0192004 A1 | 7/2010 | Bauchot et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2012/0045040 A1 | 2/2012 | Maes |
| 2012/0047506 A1 | 2/2012 | Maes |

OTHER PUBLICATIONS

U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
Andrews, Tony et al., Business Process Execution Language for Web Services, Version 1.1, BEA Systems, International Business Machines Corporation, SAP AG, Siebel Systems, May 5, 2003, 31 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Burger, E. et al., "Deploying CCXML for Application-Layer Call Control," Aug. 2006, 11 pages.
Dhesikan, "Quality of Service for IP Videoconferencing—Engineering White Paper," Cisco Systems, Jun. 1, 2001, 16 pages.
International Search Report and Written Opinion of PCT/US2010/037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.
Maes, Stephane, Multi-modal Web IBM Position W3C/WAP Workshop, IBM Research Human Language Technologies, http://www.w3.org, accessed May 26, 2003, 9 pages.
Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet," <http://java.sun.com/products/jain/JSLEE-SIPServlet.pdf, 2003, 13 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, http://www.linktionary.com/policy.html, accessed Aug. 2, 2004, 4 pages.
Romellini, C. et al., "CCXML: The Power of Standardization," Loquendo, Sep. 27, 2005, 7 pages.
Seely, Scott, "XML and Web Services Security: Understanding WS-Security," Microsoft Corporation, 2002, 11 pages.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm, accessed May 26, 2003, 5 pages.
Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html, accessed May 26, 2003, 7 pages.

The Parlay Group, "Specifications," <http://web.archive.org/web/20050114014707/www.parlay.org/specs/index.asp>, Jan. 14, 2005, 2 pages.
Thomas, Ann M., "Registering a Web Service in UDDI," SOA World Magazine, Sep. 26, 2003, 9 pages.
Wikipedia, "Object-Oriented Programming," <http://web.archive.org/web/20051211141918/http://en.wikipedia.org/wiki/Object-oriented_programming>, Dec. 11, 2005, 10 pages.
Wikipedia, "OSI model," <http://web.archive.org/web/20050907132012/http://en.wikipedia.org/wiki/Osi_model>, Sep. 7, 2005, 8 pages.
Wikipedia, "Parlay," <http://web.archive.org/web/20050130172632/en.wikipedia.org/wiki/Parlay>, Jan. 30, 2005, 3 pages.
U.S. Appl. No. 11/848,347, filed Aug. 31, 2007, Notice of Allowance mailed Mar. 2, 2012, 9 pages.
U.S. Appl. No. 11/848,347, filed Aug. 31, 2007, Advisory Action mailed May 23, 2011, 3 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Office Action mailed Sep. 30, 2010, 19 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Advisory Action mailed May 25, 2011, 3 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Notice of Allowance mailed Aug. 5, 2011, 13 pages.
U.S. Appl. No. 11/926,738, filed Oct. 29, 2007, Office Action mailed Nov. 10, 2010, 12 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 28, 2011, 3 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Notice of Allowance mailed Dec. 9, 2011, 7 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 11 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Advisory Action mailed Jul. 15, 2011, 3 pages.
U.S. Appl. No. 11/951,500, filed Dec. 6, 2007, Final Office Action mailed Apr. 14, 2011, 33 pages.
U.S. Appl. No. 11/951,500, filed Dec. 6, 2007, Office Action mailed Sep. 1, 2010, 30 pages.
U.S. Appl. No. 11/951,500, filed Dec. 6, 2007, Office Action mailed Apr. 11, 2012, 6 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Advisory Action dated Mar. 18, 2011, 3 pages.
U.S. Appl. No. 10/855,999, filed May 28, 2004, Final Office Action dated Jan. 5, 2011, 19 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005 Office Action dated Aug. 5, 2008, 18 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Mar. 15, 2012, 10 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Final Office Action dated Jun. 1, 2011, 11 pages.
U.S. Appl. No. 11/024,160, filed Dec. 27, 2004, Notice of Allowance dated Aug. 4, 2011, 15 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.

U.S. Appl. No. 11/024,160, filed Dec. 27, 2004, Office Action dated Aug. 22, 2008, 8 pages.
U.S. Appl. No. 11/123,468, filed May 5, 2005, Advisory Action dated Jan. 18, 2011, 2 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Final Office Action mailed Mar. 16, 2011, 21 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Office Action mailed Sep. 28, 2011, 15 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Advisory Action mailed Feb. 27, 2012, 3 pages.
U.S. Appl. No. 12/019,335, filed Jan. 24, 2008, Final Office Action mailed Dec. 5, 2011, 19 pages.
U.S. Appl. No. 12/019,335, filed Jan. 24, 2008, Office Action mailed May 23, 2011, 18 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Office Action dated Oct. 18, 2011, 21 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Apr. 26, 2012, 18 pages.
U.S. Appl. No. 11/357,653, filed Feb. 16, 2006, Advisory Action dated Oct. 12, 2011, 3 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Notice of Allowance mailed Aug. 22, 2011, 8 pages.
U.S. Appl. No. 12/544,459, filed Aug. 20, 2009, Office Action mailed Mar. 2, 2011, 10 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Advisory Action dated Feb. 9, 2012, 2 pages.
U.S. Appl. No. 12/544,484, filed Aug. 20, 2009, Final Office Action dated Dec. 1, 2011, 8 pages.
U.S. Appl. No. 12/544,484, filed Aug. 20, 2009, Office Action dated Jun. 3, 2011, 6 pages.
U.S. Appl. No. 11/949,930, filed Dec. 4, 2007, Notice of Allowance mailed Mar. 19, 2012, 19 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Advisory Action mailed Jan. 5, 2012, 3 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Office Action mailed Jun. 10, 2011, 13 pages.
U.S. Appl. No. 12/014,387, filed Jan. 15, 2008, Final Office Action mailed Apr. 5, 2012, 17 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Final Office Action mailed Feb. 1, 2012, 30 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Final Office Action mailed Aug. 25, 2011, 20 pages.
U.S. Appl. No. 12/019,299, filed Jan. 24, 2008, Office Action mailed Jan. 24, 2011, 16 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 12/019,299, filed Jan. 24, 2008, Office Action mailed Mar. 31, 2010, 13 pages.

* cited by examiner

SESSION INITIATION PROTOCOL-BASED INTERNET PROTOCOL TELEVISION

CROSS-REFERENCES TO RELATED APPLICATIONS

This application is a continuation of U.S. patent application Ser. No. 11/943,101, filed Nov. 20, 2007, entitled "SESSION INITIATION PROTOCOL-BASED INTERNET PROTOCOL TELEVISION," which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the delivery of multimedia content. In particular, the invention relates to the control and delivery of video over an IP-based network.

As high speed digital connections become more common, applications and services are increasingly being offered over such connections. For example, an increasing number of people are transferring their telephony services to broadband-based technologies, such as Voice over IP (VoIP), which provide for the initiating and routing of voice conversations over the Internet or another IP-based network. An increasing number of people are also receiving video such as "cable" television over a broadband connection. One technology for delivering digital television service is Internet Protocol Television (IPTV), which delivers high-quality multi-channel television and streaming video content using an Internet Protocol over an IP-based network, instead of using traditional broadcast or cable technologies. The IPTV content can be played not only on a personal computer or laptop, but can be displayed on a television, cell phone, portable media player, PDA, etc.

Today IPTV typically is delivered using a protocol such as the Real Time Streaming Protocol (RTSP) as well as other such protocols. None of these approaches are based on the session initiation protocol (SIP) or a protocol that separates session control and/or signaling from transport. This lead to problems as, for example, SIP-based devices cannot take full advantage of IPTV and other types of control mechanisms for multimedia data with, for example, VCR-like functionality. As a result it also is difficult to allow a SIP or HTTP/SIP application, for example, to provide IPTV-like services, at best simply serving content catalogs and not much more. Similarly, networks such as IMS designed for SIP cannot directly use IPTV as part of the SIP/IP IMS architecture. The exchange has to be treated as purely network-based, which defeats some of the design principles of IMS. Also, RTSP is a stateful protocol that does not utilize a session ID, such that a permanent TCP connection is not needed, but instead utilizes RTSP messages sent between the client and server. For multicasting video content, a protocol such as the Internet Group Management Protocol (IGMP) is typically used for a linear IPTV service delivery, wherein each host and application desiring to be part of a multicast group must use IGMP to indicate such desire. Adjacent routers must also use this protocol to communicate. Other protocol specifications may be used by some (e.g. for mobile broadcasting), but they all suffer similar issues.

These protocols tend to be complex, and require specific architectures. For companies such as telecommunications companies, which are already losing revenue to cable companies who are now offering telephony services, it would be desirable to be able to offer ITPV using existing telecommunications technologies and architectures, without the need for extensive upgrades and more complex systems. Further, there are services that are not offered by protocols such as RTSP, such as third party control of a stream between a client and a server, that it would be desirable to be able to offer to a customer or third party vendor.

BRIEF SUMMARY OF THE INVENTION

Systems and methods in accordance with various embodiments of the present invention can overcome these and other deficiencies in existing media content delivery systems. A signaling or session control system, utilizing an appropriate messaging protocol and which is separated from the delivery of media, allows a client device to directly control the delivery of content from a media server, allowing the client device to obtain VCR-function style control over a media stream from the media server and exchange quality of service information, regardless of whether the media content is ultimately stored or buffered on the client device. This signaling system can include or be based on, for example, the session initiation protocol (SIP). The system also can work in a peer to peer environment, or can work via a third party call control of a media session. One embodiment includes a SIP based IPTV solution, such as an IPTV solution where signaling is decoupled from the delivery of media, and which allows for real-time VCR type control of the stream and the collection of streaming statistics (e.g., QoS of stream).

In one embodiment, a service delivery device utilizes such a messaging protocol to communicate with a media server and with a client device. The service device can receive a request from any of a number of client devices to initiate a content delivery session for a client device. The service delivery device then can send the request to a content application if necessary, such as to authenticate or bill for the delivery, and passes the request on to the media server. Upon receiving the request message using the messaging protocol, the media server begins streaming or otherwise delivering the requested content. The service delivery device can receive additional requests from a client during a session to alter an aspect of the delivery stream. For example, a user of a client device might want to play, pause, reverse, forward, fast forward, fast reverse, or stop the stream from the media server. The service delivery device then passes the request onto the media server using the messaging protocol so that the media server can alter the stream appropriately.

Embodiments as discussed herein can take advantage of a number of deployment models, such as in SIP where there can be a client to server deployment (which can include a peer to peer or real client to real server deployment), and a client to server (using SIP and RTP) and server to source deployment. Embodiments also can utilize a third party multimedia call control, such as a B2B UA or call control enabler.

The media content can be any appropriate content, such as Internet Protocol Television (IPTV) content. Also, the media server can be any appropriate media server, such as a Real Time Streaming Protocol (RTSP) media server, and a messaging protocol-enabled RTSP gateway can be used to receive the requests from the service delivery device and send a corresponding RTSP request to the media server in response thereto. Information regarding the delivery of content can be contained in a header of the initial messaging protocol message and any subsequent messaging protocol message. Alternatively, information regarding the delivery of content can be contained in a messaging protocol request specific to the delivery of content.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1A:
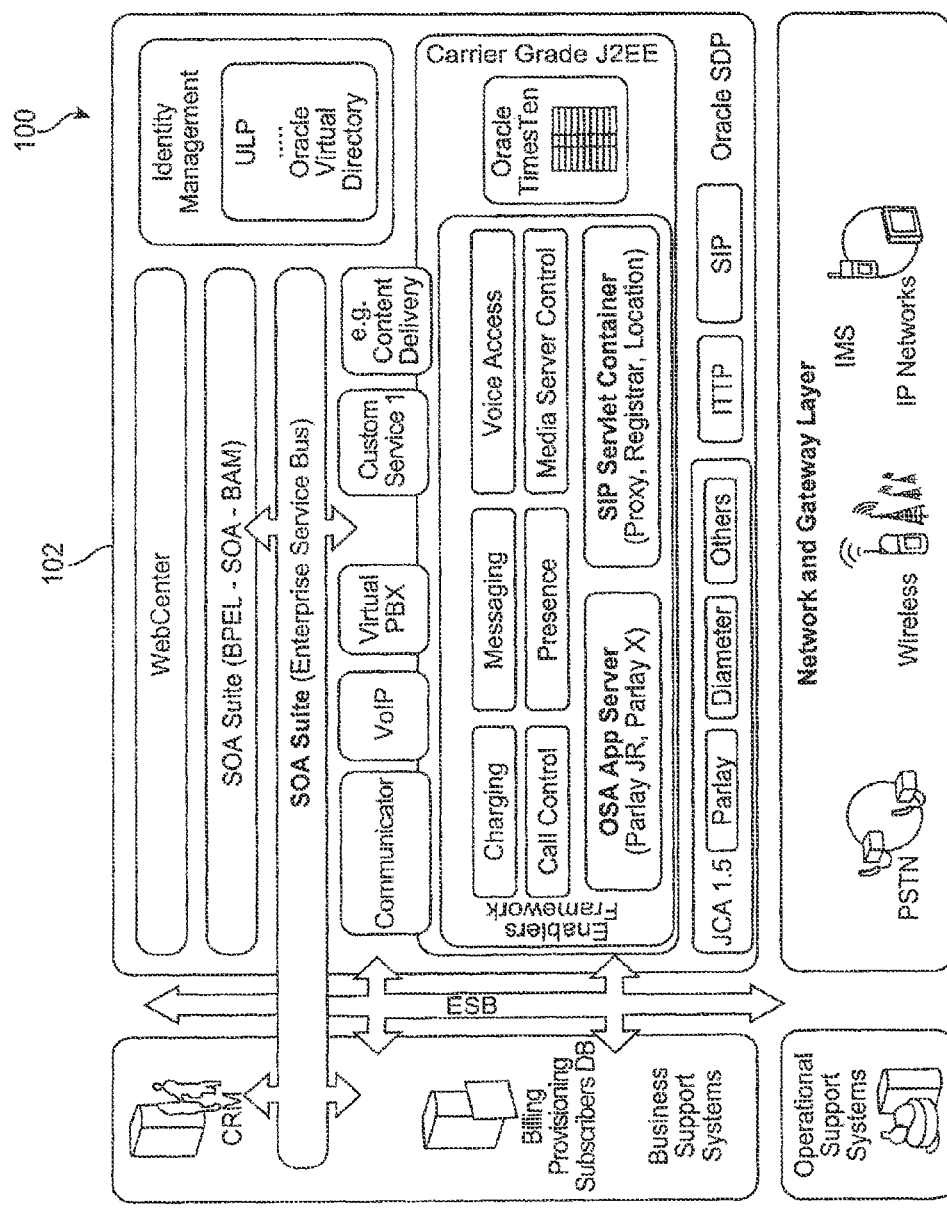
FIGS. 1(a) and 1(b) illustrate a service delivery platform-based architecture that can be used with various embodiments of the present invention.

Systems and methods in accordance with various embodiments can overcome the aforementioned and other deficiencies in existing multimedia delivery systems by providing a signaling or session control system based approach to IPTV, and media streaming in general, where processing is performed on the stream and not on downloaded files or buffered buckets of streams. The stream can be processed directly using a messaging protocol such as the Session Initiation Protocol (SIP), for example, instead of a protocol such as RTSP that is presently used for broadcasting information. Such an approach allows video streams to be driven using SIP requests, such as is used for VoIP and other multimedia exchanged, using existing service delivery platforms and other such architecture. Traditionally, SIP allows for functionality such as starting, stopping, pausing, and muting (e.g., via the Session Description protocol (SDP) (e.g. exchange of mismatched SDPs)) a content stream, as well as selecting an appropriate codec (e.g., MPEG-2, H.264/MPEG4 AVC, Windows® media player codec, etc.) and redirecting the stream. Through slight extensions to SIP messaging, IPTV can be controlled via SIP, and can offer functionality such as forward, fast forward, reverse, fast reverse, pause, and record. Using SIP also allows for third party control, such as by a television listing application that can direct a media server to stream content to a client device.

SIP can also be used to establish a peer-to-peer connection between a client device and a content server, for example, to allow the client to directly control the media stream. SIP has an advantage over RTSP for such purposes, as SIP provides for bi-directional messaging between SIP endpoints, while RTSP is a one-directional protocol wherein a media server can either play or record data, with the direction indicated at the setup of the media stream. Both endpoints can be controlled in a full duplex/bi-directional stream. A bidirectional VCR stream, for example, allows for functions such as real-time video calls. To further explain the differences from existing systems, in peer-to-peer models one peer can see what the other peer sees, or what is being played, without the ability to perform functions such as playback or reverse, unless that peer is locally storing or buffering the information on the receiving side. In an approach in accordance with one embodiment, data can remain stored only on the sending side, but can be controlled from the receiving side. In such a case, the sender behaves as a media server for the stream.

In the case of SIP, for example, a third party multimedia call control enabler can be used that allows a third party application to control the multimedia stream. Such functionality cannot easily be achieved with a traditional IPTV solution, at least not within a Web-type application based on SIP and HTTP. Embodiments in accordance with the present invention can allow a web application (e.g., SIP or converged SIP+HTTP) to drive/control the behavior of the streamed data, including VCR-type functionality. In third party and peer to peer implementations, for example, statistics can be exchanged regarding the quality of the stream, such as via a SIP client to server or client to application approach. So that other measures can be taken to correct a pause/replay buffer, logic for the application can utilize the third party multimedia call control, or the client or server (e.g., in client/server mode).

Figure 1B:
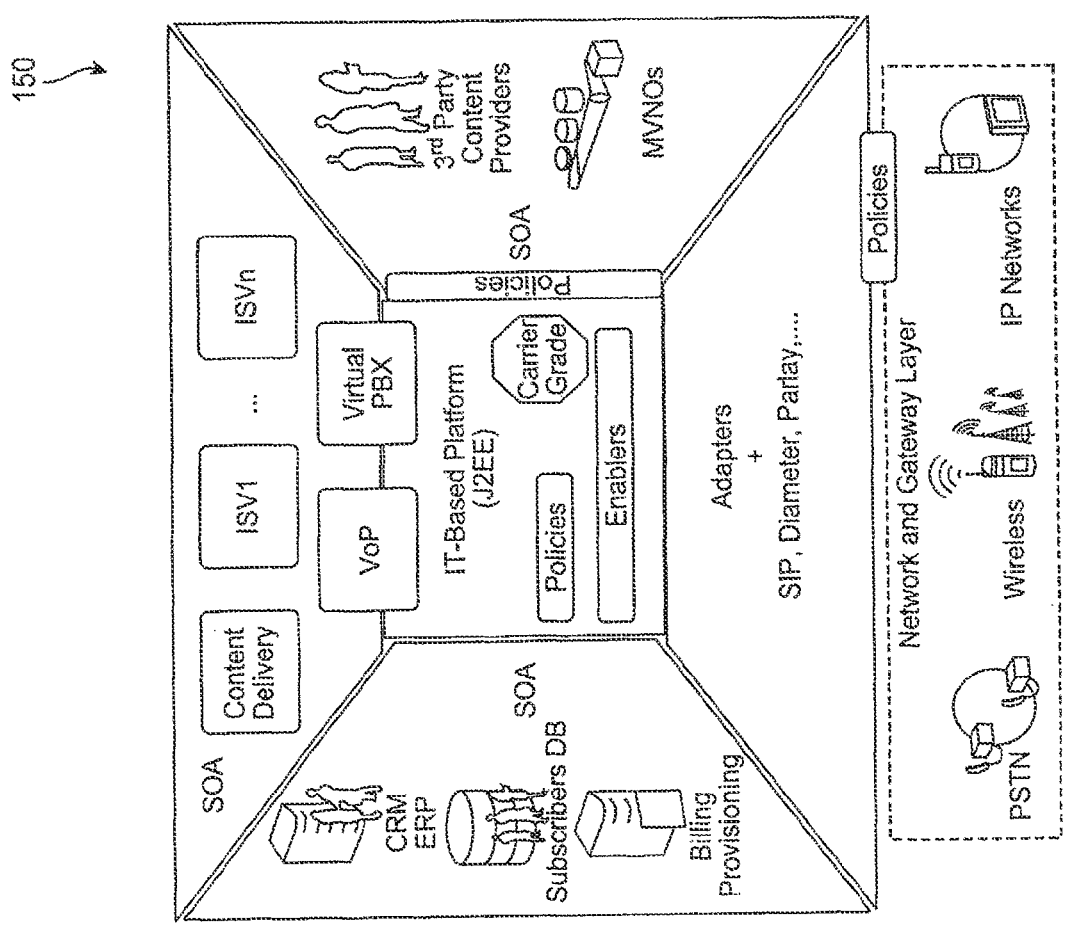

As discussed above, it is desirable for certain embodiments to function with existing technologies used by entities such as telecommunications companies. In one such embodiment, a SIP implementation takes advantage of a service delivery platform (SDP)-based architecture 100, such as is illustrated in FIGS. 1(a) and 1(b). In the exemplary architecture 100 of FIG. 1(a), the SDP 102 includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 1(b), the SDP configuration 150 implements the desired functionality on top of an underlying J2EE core provided by the application server. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle fusion middleware/OC4J as well as JBOSS, BEA Weblogic, and IBM Websphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object etc. can share context and interact with each other's, when it makes sense) and carrier grade (details provided after). This includes the use of TimesTen and open source technologies like JGroups, and also can be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.g. Parlay network presence) and provide northbound parlay X interface for application to use presence without participating to the presence network. Location data can be modeled as a presence attribute using an extensible presence data model. A multi-channel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

In one embodiment, the service delivery platform (SDP) is a standards-based horizontal platform that abstracts the underlying network resources, follows a service-oriented architecture, and realizes OSE. The platform can be a SOA platform based on J2EE, which includes a J2EE converged container and exposes various communication enablers. Enablers can include, for example, call control enablers and media server control enablers as discussed elsewhere herein. Further, interfaces can be exposed to applications and other enablers and resources for usage of various functionality. Some or all of the interfaces can be standard or standardizable, as is its behavior, such as may include OMA, Parlay, Parlay X, and WS components. For the purpose of the SDP, these enablers can provide various MVC (Mobile/Voice/Communications) functionality. The applications can be built using one or more enablers, and can add notions like a user interface (UI), user management, and charging, either in the code or via delegation and orchestration.

In order to provide the media stream control functionality in SIP, one approach involves adding to the header of a SIP message, such as an SIP call flow message. The header can be modified to explicitly provide for additional comments that can be used to provide the desired stream control. These options can include, for example, functionality such as fast forward, reverse, pause, and record, among other such options known for controlling video display or playback. In one embodiment, SIP can be used as currently implemented, with a call flow message that contains in the header of the message the requested operation. In another embodiment, a new explicit comment can be added to a SIP call flow message that supports this functionality. These capabilities can be added to a call control enabler or a media server enabler, for example, and can be accomplished directly in SIP AS as a SIP application (e.g., a SIP servlet like JSR 116 or JSR 289).

FIG. 2 illustrates an architecture 200 utilizing a call control enabler of a service delivery platform (SDP) in accordance with one embodiment. A description of such a call control enabler can be found, for example, in U.S. Provisional Patent Application No. 60/896,676, filed Mar. 23, 2007, entitled "Call Control Driven MVC Programming Model for Mixing Web and Call or Multimedia Applications," as well as U.S. patent application Ser. No. 11/949,930, filed Dec. 4, 2007, entitled "Call Control Enabler Abstracted from Underlying Network Technologies," and U.S. patent application Ser. No. 11/877,129, filed Oct. 23, 2007, U.S. Pat. No. 7,853,647, issued Dec. 14, 2010, entitled "Network Agnostic Media Control Enabler," each of which is hereby incorporated herein by reference. The notion of enablers and service layers is further described in U.S. patent application Ser. No. 11/357,653, filed Feb. 16, 2006, entitled "Factorization of Concerns to Build a SDP (Service Delivery Platform)", which is hereby incorporated herein by reference.

In one embodiment, VCR-style playback and control functionality is achieved by associating each new instruction (e.g., pause, fast forward) to a new SIP message such as PAUSE, FORWARD, REWIND, FAST FORWARD, FAST REWIND (as well as other speeds), MUTE, SKIP, RESTART FROM BEGINNING, RESTART FROM WHERE STOPPED, etc., along with a time argument (i.e., how much fast forward) or fast forward start until fast forward stop. In another approach, these instructions are added as arguments or header instructions of existing SIP messages such as INFO or NOTIFY. Errors, status, and other information can also be provided as extended instructions or passed as header/info messages. Which approach is selected does not matter, nor does the actual syntax or resulting flows. Many options exist, and for different technical reasons some may be preferable in certain situations. What is important is that the SIP messages and flows are able to convey these instructions to the media server, and based thereon the media server can appropriately modify the media stream or multimedia streams.

Figure 2A:
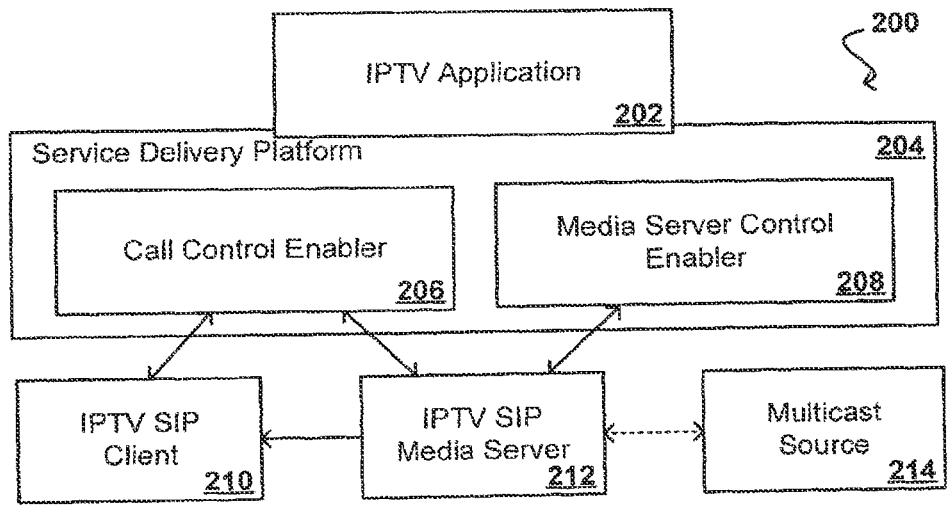
FIGS. 2(a), 2(b), and 2(c) illustrate deployment models that can be used in accordance with embodiments of the present invention.

FIG. 2(a) illustrates an exemplary architecture 200 utilizing a call control enabler of a service delivery platform (SDP) in accordance with one embodiment. As used herein, the term "enabler" refers to a reusable service layer component that can be used to provide an intrinsic function for use by others (other enablers, applications, services, or authorized resources) through appropriate northbound interfaces. An enabler can access resources, devices, or OSS/BSS functions, for example, through the SDP via any mechanism appropriate for the resource. A call control enabler can be defined as an enabler that allows an application to perform base multimedia session handling. While such an approach relates to a third party multimedia call control case as discussed above, enablers are not necessary in all embodiments discussed herein. Even in embodiments using a SIP servlet in B2B UA mode an enabler is not necessary, including both a call control enabler and a media server control enabler. In FIG. 2(a), for example, the enabler could simply be a SIP servlet application, for example.

In FIG. 2(a), access to an IPTV application 202 is provided through the SDP 204. A SIP-enabled IPTV client 210, such as a television box or cell phone, can communicate with the IPTV application through the SDP. This system also includes a SIP-enabled media server 212 capable of receiving SIP messages and streaming content to the client 210 in response thereto. In one embodiment, the IPTV initiates the IPTV stream, while in another embodiment the client contacts the IPTV application to request initiation of a stream. The call control enabler 206 in either approach then can receive instructions from the IPTV application to establish a media session for the client. For example, the IPTV application can be a television listing application that has been programmed by a user of the client device to have a particular video program delivered to the client device at a particular time. In one example, the IPTV application can be programmed to deliver a program to be recorded locally at the client device, such as for a digital video recorded (DVR). In another example, a client device can instruct the media server to stream content to the client device at certain times of day, such as for a business that wants content streaming during business hours, or to stream a certain media file as soon as it becomes available. The call controller can send the initial SIP message to the media server to start the stream, and can send another message to the client device to be ready to receive the stream (thereby establishing a session). A media server control enabler 208 can send subsequent SIP messages to the media server to control the stream, such as to change the quality of the stream, engage in trick modes (e.g., fast forward or reverse), or stop the stream to the client at a certain time.

A media server control enabler for stream control can be any appropriate media server adapter (e.g., MSML, MSCML, MSCP, MRCP or another control protocol). In cases where SIP may not be involved, protocols such as MRCP, MOML, MGCP or MEGACO still can be used for control of the media server. As discussed, any protocol can be used with the media control enabler and it is not necessary for the enabler to be driving with SIP as southbound adapter. As a result, the application can use the media server control protocol to control the server with SIP or with non SIP adapters/protocols. Further, as the enabler is not required, these protocols also can be implemented directly. In such cases, however, the client still can have communicated to the application via SIP that there is a desired change to the delivery stream.

The IPTV SIP media server also can be in communication with at least one multicast source 214 in order to support multicasting of material to media servers when needed. In some embodiments, once the stream is established by the call control enabler the client can be able to send SIP requests directly to the media server in order to control the video stream. In other embodiments, there may be more than one third party application involved in the process, such as one application to initiate the stream and another to provide for stream control or quality.

Figure 2B:
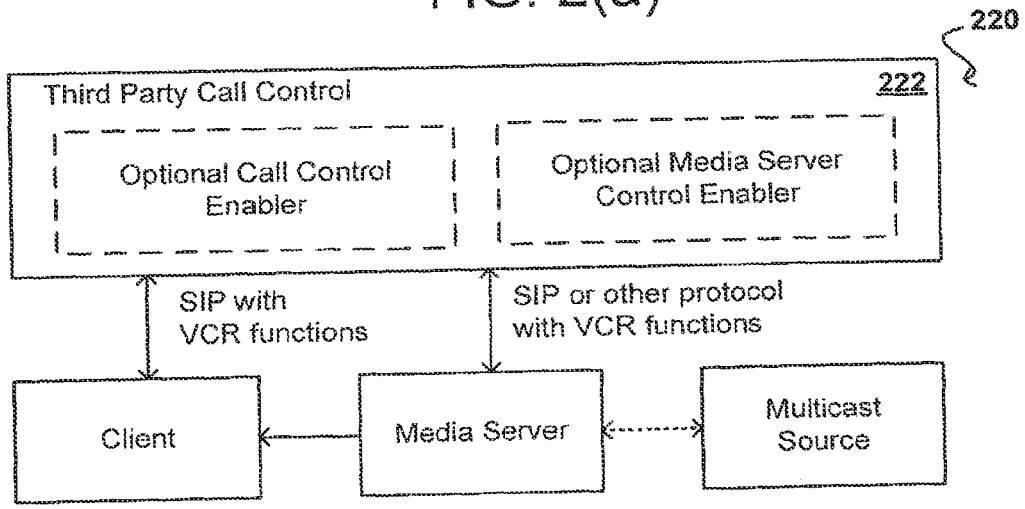
Figure 2C:
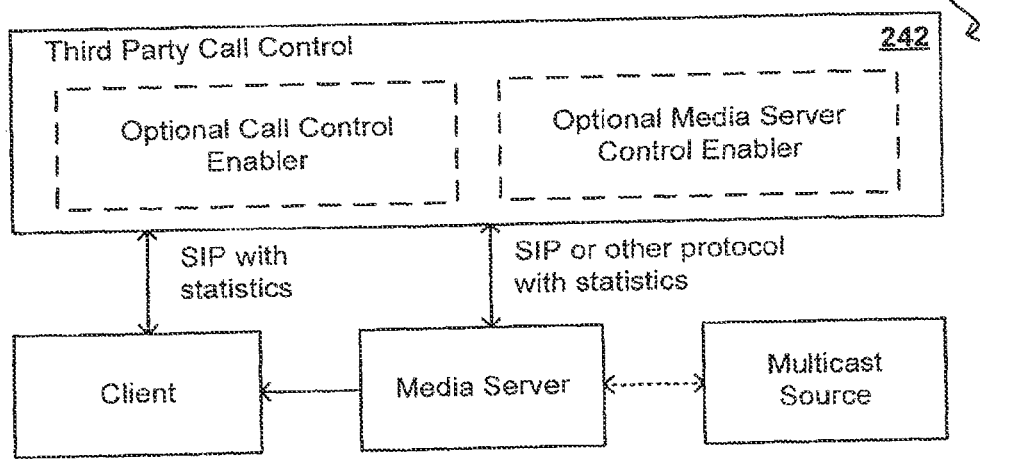

FIG. 2(b) illustrates another deployment model 220, which utilizes a third party call control 222 that can operate with or without a media server control enabler and/or a call control enabler. In this case, the third party call control can operate with SIP or another protocol to provide VCR-type functionality. The third party call control can communicate with a client and server, which can send requests to the source. Such an approach also can be used to exchange statistics and/or feedback regarding the quality of the stream on the signaling exchanges (e.g., SIP). For example, FIG. 2(c) illustrates a deployment model 240 wherein the third party call control 242 communicates via SIP or another protocol with an exchange of statistics regarding the stream quality. Each party can send, receive, request, subscribe to, or publish statistics, observations, feedback, and other such information. This can allow such information to be sent or obtained when available to those who are interested, for example. The model for exchange can be, for example, INFO/NOTIFICATIONS or presence-based subscribe/notify statistics (e.g., SIP/SIMPLE). See also the description with respect to FIG. 4. The statistics may also go to another entity, e.g., in publish/subscribe mode a la presence, where a monitoring console can subscribe to the feedback/statistics.

Figure 3:
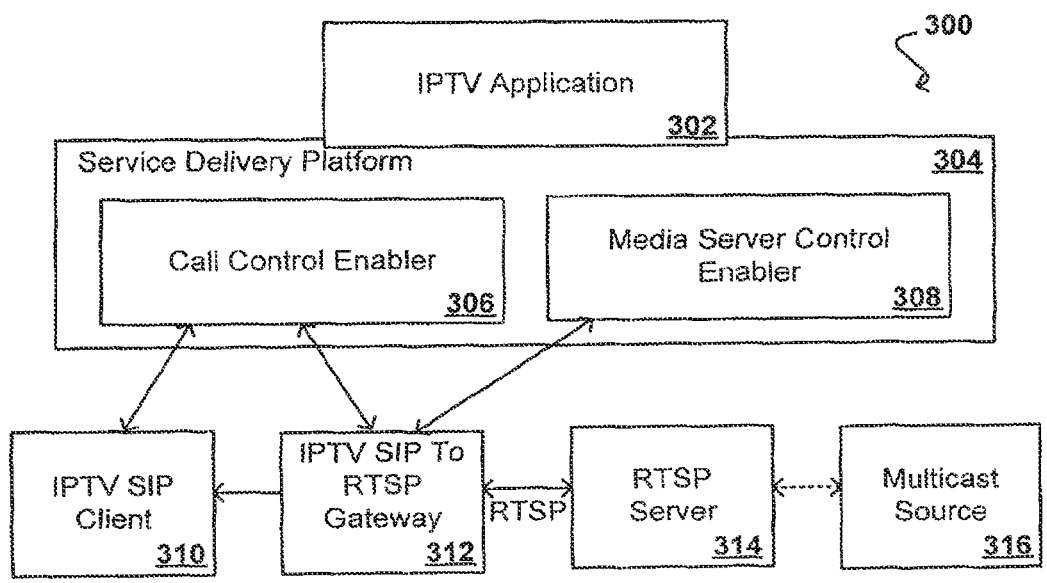
FIG. 3 illustrates components of a SIP-based IPTV system in accordance with one embodiment of the present invention.

FIG. 3 illustrates a system 300 in accordance with another embodiment, which provides for coexistence of solutions based on SIP and RTSP-based legacy solutions. The system in this embodiment takes advantage of RTSP servers 314 with a SIP to RTSP gateway 312, although other cases can be considered where, for example, the system goes from an in-band signaling to an out-band factored out signaling. Such a gateway is not a straight forward gateway, however, as the gateway would have to model more than simply client/server interactions. In this approach, a standard RTSP media server 314 can be used, and the SIP to RTSP Gateway 312 can allow the call control enabler to still initiate a session between the RTSP server 314 and the client 310 at the direction of the third party application 302, and can allow the media server control enabler 308 of the SDP 304 to control the stream from the media server 314 through the gateway 312, which can communicate with the server using RTSP. A multicast source 316 can still be used to multicast to the RTSP server. It should be understood that while many examples and embodiments discuss the invention with respect to streaming that other delivery or download modes can be used as would be apparent to one of ordinary skill in the art in light of the teachings and suggestions contained herein.

Figure 4:
FIG. 4 illustrates components of a SIP-based IPTV system in accordance with one embodiment of the present invention.

FIG. 4 illustrates a system 400 in accordance with another embodiment, wherein the stream is controlled directly by a SIP-enabled client 402 in a peer-to-peer type arrangement, or in a client/server case, for example, without the need for a third party application, call enabler, media server control enabler, or SIP servlet/application implementations that perform equivalent functions. The client 402 is able to send SIP messages to the SIP-enabled IPTV media server 404 in order to initiate the stream and then control the stream. A multicast source 406 can be used a previously described. In this embodiment, because the client and IPTV server are able to initiate and control a stream directly, without a third party application, there can be no need to interact with a call control enabler, and there may also be no need for a media server control enabler of the service delivery platform. The SIP client 402 can send an initial SIP request for a stream directly to the media server 404, and can send any subsequent messages as desired to control the stream and perform any trick functionality (e.g., fast forward, etc.).

A system such as that of FIG. 4 also can allow for both end points to be controlled in a full duplex/bi-directional stream. This can allow for functionality such as, for example, a real-time video call between the two end points.

It also can be desirable to provide statistics such as the quality of a particular video stream being delivered to a client, such is provided by RTSP-based systems. In order to provide such functionality, a SIP message can be generated that is used to describe the quality of the stream that has been received by the receiver (e.g., the SIP client). Upon receiving the message indicating the quality, the IPTV network or system can adjust the quality of service, bandwidth, etc., in order to adjust the quality to a determined level. There can be different qualities of service expected for different functions—such as a high quality of service for standard playback and a lower quality of service for fast forward playback, for example. Again, the system can provide VCR-style functionality for playback and control using a SIP-based approach.

Figure 5A:
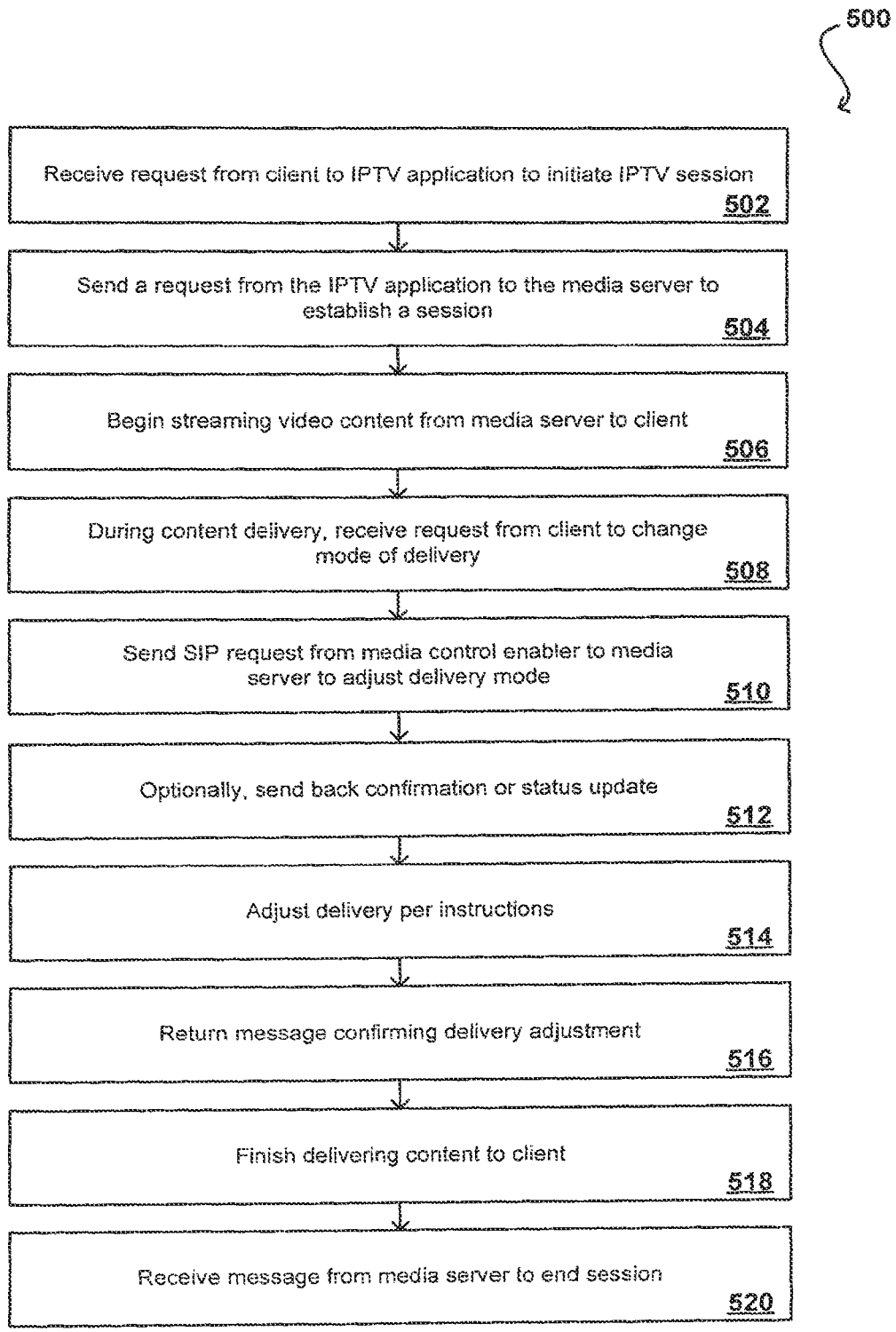
FIGS. 5(a), 5(b), and 5(c) illustrate steps of exemplary methods in accordance with one embodiment of the present invention.

FIG. 5(a) illustrates steps of an exemplary method 500 for providing video content to a client in accordance with an embodiment that utilizes a third party IPTV application. In this example, a client sends a request to an IPTV application to request delivery of IPTV content 502. The IPTV application works through a call control enabler to send a SIP request to a SIP-enabled IPTV media server to establish a session between the client and the media server 504. The media server then can begin to stream the video content to the client 506. During the session, the client can send a SIP request through the call control enabler to place the transfer into a trick mode, such as a fast forward or reverse mode 508. A media server control enabler then can send a SIP request to the media server to enter into the appropriate trick mode 510. The same process can be used to return to regular playback mode, go into another trick mode, end a session, adjust a quality of service of the stream, etc. Optionally, the media server can send back confirmation or a status update, such as waiting or an error message 512. The media server adjusts the delivery appropriately 514 (e.g., fast forward per the instructions) and returns a SIP extension confirming that the delivery has been adjusted 516. Once the media server finishes delivering the content 518, the media server can send a SIP request to the IPTV application to end the session 520. In some embodiments, the call control enabler and media control enabler send SIP requests instead to a SIP-enabled RTSP gateway, which in turn passes on requests to an RTSP media server via RTSP, simulating/emulating a RSTP client.

Figure 5B:
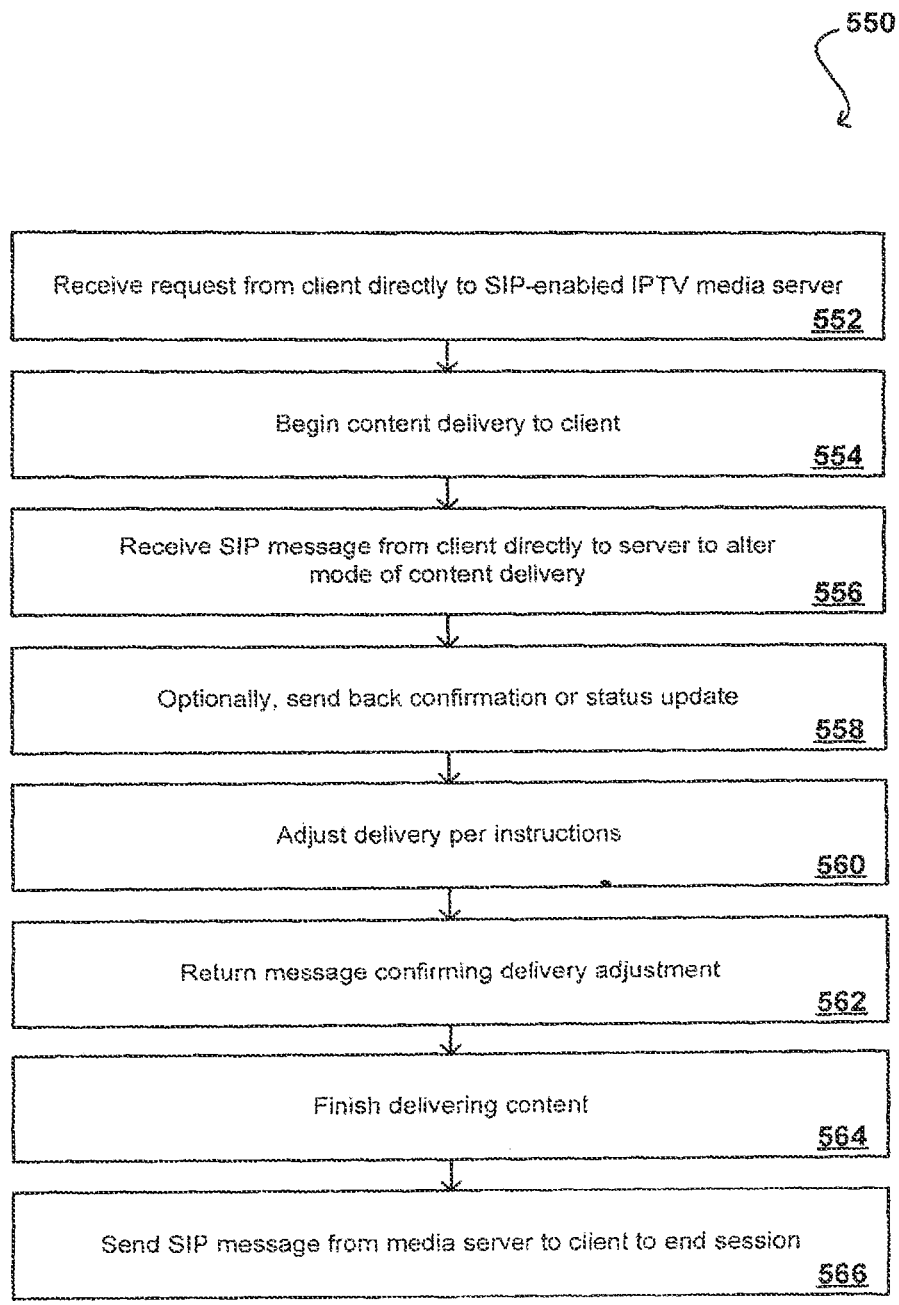

FIG. 5(b) illustrates steps of an exemplary method 550 for providing video content to a client in accordance with an embodiment that utilizes a peer-to-peer style approach. In this example, a client sends a SIP request directly to a SIP-enabled IPTV media server to request delivery of IPTV content and establish an IPTV session 552. The media server then can begin to stream the video content to the client 554. During the session, the client can send a SIP request directly to the media server to alter the mode of transfer, such as from a regular delivery mode into a trick mode, such as a fast forward or reverse mode 556. The same process can be used to return to regular playback mode, go into another trick mode, end a session, adjust a quality of service of the stream, etc. Optionally, the media server can send back confirmation or a status update, such as waiting or an error message 558. The media server adjusts the delivery appropriately 560 (e.g., fast forward or reverse per the instructions) and returns a SIP extension confirming that the delivery has been adjusted 562. Once the media server finishes delivering the content 564, the media server can send a SIP request to the client to end the session 566.

Figure 5C:
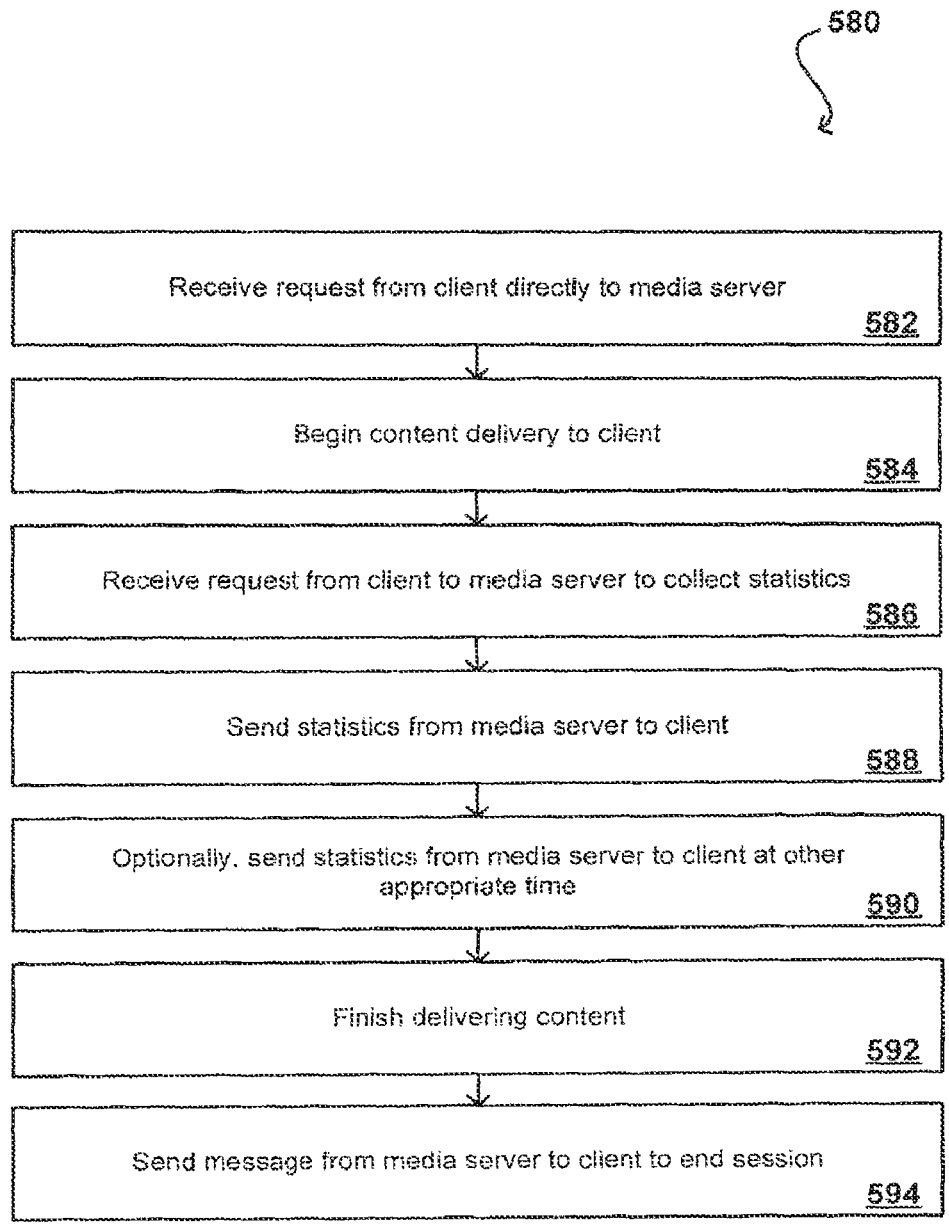

FIG. 5(c) illustrates steps of an exemplary method 580 for providing video content to a client and collecting/passing statistics for the stream in accordance with an embodiment. This particular example is described using a peer-to-peer style approach, but it should be understood that statistics can be utilized similarly using different deployment models discussed herein. In this example, a client sends a request directly to a media server to request delivery of content and establish a session 582. The media server then can begin to stream the video content to the client 584. During the session, the client can send a request directly to the media server to request statistics for the stream, such as are used to determine a quality of service for the stream 586. The media server can send a response including the appropriate statistics 590. Optionally, such as in the case where the client subscribes to statistics information, the server can send a message including statistics at an appropriate time 592, such as where there is a change in the quality of service. Once the media server finishes delivering the content 594, the media server can send a request to the client to end the session 596.

Such an approach can be important, as many service providers are presently focusing their short or long term attention to IMS and its value proposition. It is envisioned that SIP-based networks ranging from vanilla SIP on the Internet to IMS will be widely deployed. Unfortunately, IPTV as currently envisaged is not SIP based or considered to be SIP friendly, as using currently technology SIP can at best be used to initiate a RTSP session and nobody knows how to fit SIP IPTV in the IMS architecture other than as underspecified MRFC/MRFP. It therefore is not only desirable to make IPTV work with SIP, but to make it easy to implement and understand using existing technology as described herein.

Embodiments of the present invention may be implemented in SIP using methods and systems described in co-pending U.S. patent application Ser. No. 11/383,024, entitled "SIP Routing Customization" filed on May 12, 2006 which is incorporated herein by reference in its entirety for all purposes. However, embodiments of the present invention are thought to be equally applicable to other signaling protocols. In another example, the interface of the call control enabler may use some Parlay or other interfaces. It should also be noted that, while described herein with regard to video on demand, embodiments in accordance with the invention are transposable to any multimedia sessions or exchanges, not just video deliver. In other cases, embodiments of the present invention can provide a multimedia session that can be directed to a generic processor that interacts with the media and extracts data then returns a result to the invoking or controlling application that then decides how to processed. The multimedia session may be SIP or another protocol. The media stream may be Real-time Transport Protocol (RTP), Real-Time Streaming Protocol (RTSP), Message Session relay Protocol (MSRP), or another protocol. Session control and media may be separated or combined.

Figure 6:
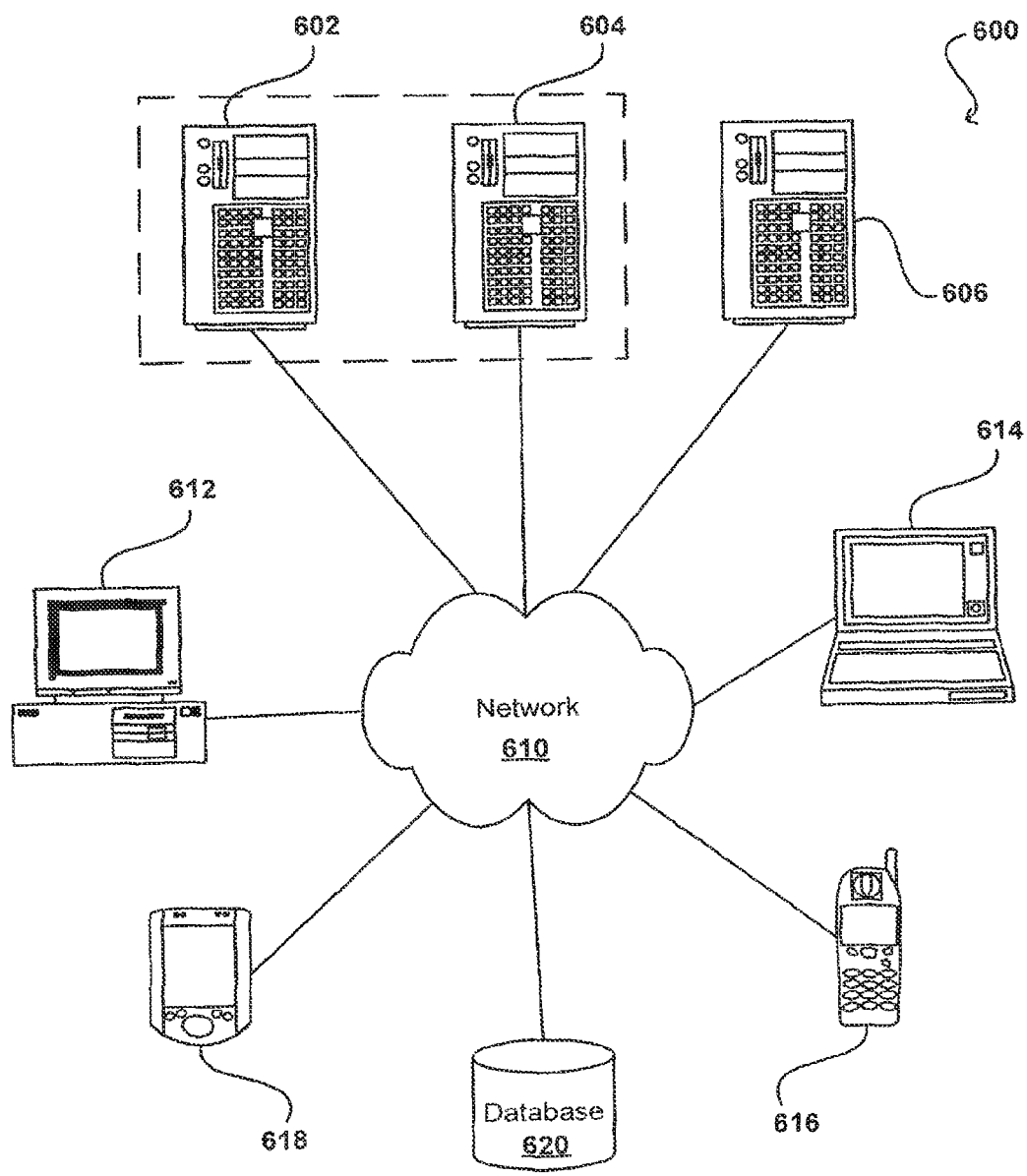
FIG. 6 illustrates components of a computer network that can be used in accordance with one embodiment of the present invention.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10 g, that is adapted to store, update, and retrieve data in response to SQL-formatted commands.

Figure 7:
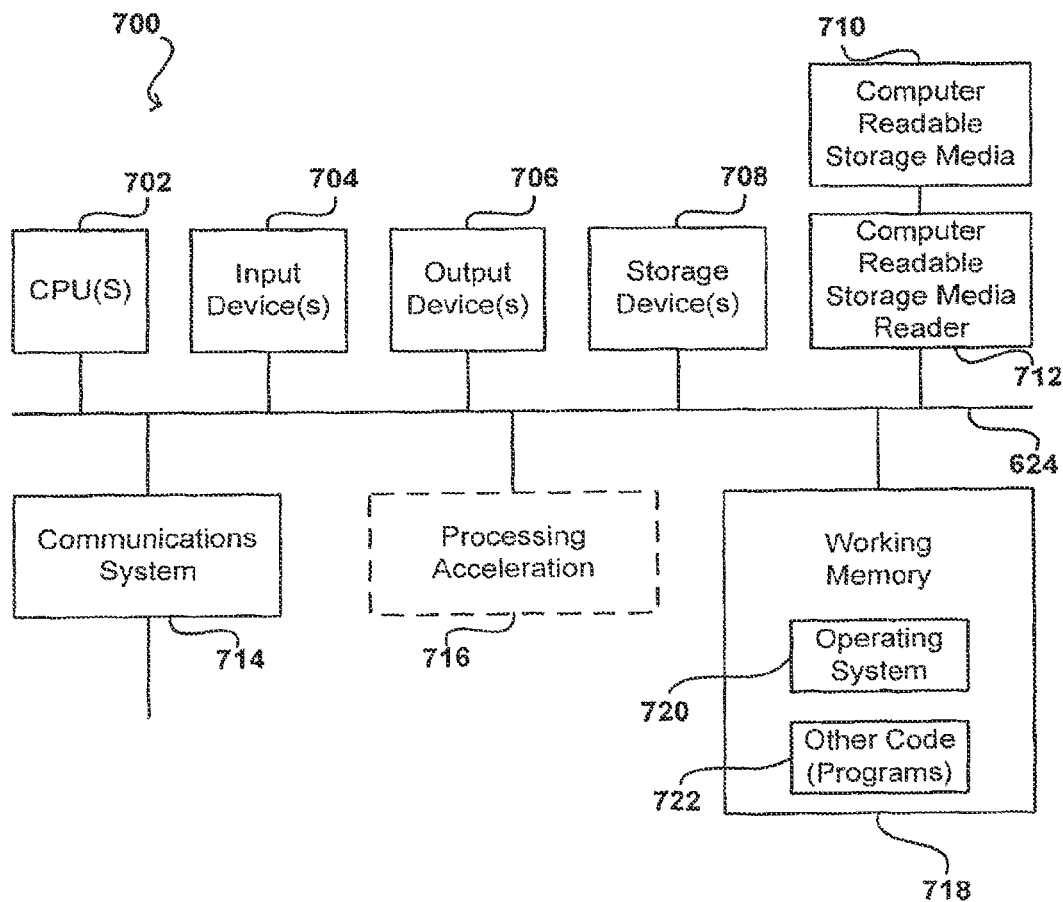
FIG. 7 illustrates components of a computerized device that can be used in accordance with one embodiment of the present invention.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of delivering multimedia content to a mobile device, the method comprising:
    establishing, by a service delivery module of a Service Delivery Platform (SDP), a session between a media server and a mobile device using a signaling protocol;
    receiving, by the SDP, an initial request in the signaling protocol from the mobile device to initiate a session for delivery of the multimedia content from the media server;
    sending, by the SDP, the initial request to the media server to begin delivery of the multimedia content to the mobile device;
    receiving, by the SDP, a subsequent request in the signaling protocol from the mobile device to alter a delivery mode of the multimedia content based on at least one of a plurality of playback control instructions from the mobile device, the at least one playback control instruction included in the subsequent request and wherein the plurality of playback control instructions includes at least a regular playback control, a pause control, a forward control, a fast forward control, and a reverse control; and
    sending a corresponding request from the SDP to the media server to alter the delivery mode of the content during delivery of the multimedia content from the media server to the mobile device and based on the at least one playback control instruction to provide the requested playback control.

2. The method of claim 1, wherein the plurality of playback control instructions further include at least a record instruction, a fast reverse instruction, a forward at selected speed instruction, a reverse at selected speed instruction, a restart from beginning instruction, a restart from stop instruction, and a stop instruction.

3. The method of claim 1, wherein the multimedia content is stored on the media server and is not stored on the mobile device.

4. The method of claim 3, wherein delivery of the multimedia content to the client mobile device comprises streaming the multimedia content to the mobile device from the media server.

5. The method of claim 4, wherein altering the delivery mode of the content during delivery of the multimedia content comprises applying by the media server the playback control to the streaming of the multimedia content.

6. The method of claim 1, wherein the multimedia content comprises Internet Protocol TeleVision (IPTV) content.

7. A computer-readable memory having stored thereon a sequence of instructions which, when executed by a processor, cause the processor to deliver multimedia content to a mobile by:
    establishing a session between a media server and a mobile device using a signaling protocol;
    receiving an initial request in the signaling protocol from the mobile device to initiate a session for delivery of the multimedia content from the media server;
    sending the initial request to the media server to begin delivery of the multimedia content to the mobile device;
    receiving a subsequent request in the signaling protocol from the mobile device to alter a delivery mode of the multimedia content based on at least one of a plurality of playback control instructions from the mobile device, the at least one playback control instruction included in the subsequent request and wherein the plurality of playback control instructions includes at least a regular playback control, a pause control, a forward control, a fast forward control, and a reverse control; and
    sending a corresponding request to the media server to alter the delivery mode of the content during delivery of the multimedia content from the media server to the mobile device and based on the at least one playback control instruction to provide the requested playback control.

8. The computer-readable memory of claim 7, wherein the plurality of playback control instructions further include at least a record instruction, a fast reverse instruction, a forward at selected speed instruction, a reverse at selected speed instruction, a restart from beginning instruction, a restart from stop instruction, and a stop instruction.

9. The computer-readable memory of claim 7, wherein the multimedia content is stored on the media server and is not stored on the mobile device.

10. The computer-readable memory of claim 9, wherein delivery of the multimedia content to the mobile device comprises streaming the multimedia content to the client mobile device from the media server.

11. The computer-readable memory of claim 10, wherein altering the delivery mode of the content during delivery of the multimedia content comprises applying by the media server the playback control to the streaming of the multimedia content.

12. The computer-readable memory of claim 7, wherein the multimedia content comprises Internet Protocol TeleVision (IPTV) content.

13. A system comprising:
    a media server delivering multimedia content, wherein the media server sends and receives requests using a switching protocol; and
    a Service Delivery Platform (SDP) establishing a session between the media server and a mobile device using a switching protocol, the SDP further specifying a delivery mode of the media server for the session,
    wherein the SDP receives an initial request in the switching protocol from the mobile device to initiate a session for delivery of content and sends the initial request from the SDP to the media server to begin delivery of the multimedia content to the mobile device, and wherein the SDP receives a subsequent request in the switching protocol from the mobile device to alter a delivery mode of the content from the media server to the mobile device based on a playback control instruction from the mobile device and included in the subsequent request, and sends a corresponding request from the SDP to the media server to alters the delivery mode of the content during delivery of the content and based on the playback control instruction to provide one or more of a plurality of playback control functions, wherein the plurality of playback control functions include at least a regular playback instruction, a pause instruction, a forward instruction, a fast forward instruction, and a reverse instruction.

14. The system of claim 13, wherein the multimedia content is stored on the media server and is not stored on the mobile device.

15. The system of claim 14, wherein delivery of the multimedia content to the mobile device comprises streaming the multimedia content to the mobile device from the media server.

16. The system of claim 15, wherein altering the delivery mode of the content during delivery of the multimedia content comprises applying by the media server the playback control to the streaming of the multimedia content.

17. The system of claim 13, wherein the multimedia content comprises Internet Protocol TeleVision (IPTV) content.

* * * * *

UNITED STATES PATENT AND TRADEMARK OFFICE
CERTIFICATE OF CORRECTION

PATENT NO. : 8,370,506 B2  
APPLICATION NO. : 13/416413  
DATED : February 5, 2013  
INVENTOR(S) : Maes Page 1 of 1

It is certified that error appears in the above-identified patent and that said Letters Patent is hereby corrected as shown below:

In the Claims:

In column 14, line 2, in Claim 4, delete "client mobile" and insert -- mobile --, therefor.

In column 14, line 47, in Claim 10, delete "client mobile" and insert -- mobile --, therefor.

Signed and Sealed this
Seventh Day of May, 2013

Teresa Stanek Rea
*Acting Director of the United States Patent and Trademark Office*